(12) United States Patent
Li et al.

(10) Patent No.: US 10,563,973 B2
(45) Date of Patent: Feb. 18, 2020

(54) ALL SURFACE FILM METROLOGY SYSTEM

(71) Applicant: KLA-Tencor Corporation, Milpitas, CA (US)

(72) Inventors: Shifang Li, Pleasanton, CA (US); Lena Nicolaides, Castro Valley, CA (US); Paul Horn, Milpitas, CA (US); Richard Graetz, Mountain View, CA (US)

(73) Assignee: KLA-Tencor Corporation, Milpitas, CA (US)

( * ) Notice: Subject to any disclaimer, the term of this patent is extended or adjusted under 35 U.S.C. 154(b) by 218 days.

(21) Appl. No.: 15/255,605

(22) Filed: Sep. 2, 2016

(65) Prior Publication Data

US 2017/0278236 A1    Sep. 28, 2017

Related U.S. Application Data

(60) Provisional application No. 62/314,276, filed on Mar. 28, 2016.

(51) Int. Cl.
*G06T 7/00* (2017.01)
*G01B 11/06* (2006.01)

(52) U.S. Cl.
CPC .... *G01B 11/06* (2013.01); *G06T 2207/30148* (2013.01)

(58) Field of Classification Search
CPC ........... G06T 2207/30148; G06T 7/001; H01L 22/12; G01N 21/9501; G01N 2021/8883;
(Continued)

(56) References Cited

U.S. PATENT DOCUMENTS 5,293,214 A    3/1994  Ledger
7,782,452 B2   8/2010  Mehanian et al.
(Continued)

FOREIGN PATENT DOCUMENTS

JP    2012251816       12/2012
JP    2012251816 A  *  12/2012
(Continued)

OTHER PUBLICATIONS

Frank Padera; "Measuring Absorptance (k) and Refractive Index (n) of Thin Films with the PerkinElmer Lambda 950/1050 High Performance UV-Vis/NIR Spectrometers," UV/Vis Spectroscopy; 2013; https://www.perkinelmer.com/lab solutions/resources/docs/APP_Thin—(Year: 2013).*

(Continued)

*Primary Examiner* — Sath V Perungavoor
*Assistant Examiner* — Daniel Chang
(74) *Attorney, Agent, or Firm* — Hodgson Russ LLP

(57) ABSTRACT

A system is configured to perform metrology on a front surface, a back surface opposite the front surface, and/or an edge between the front surface and the back surface of a wafer. This can provide all wafer metrology and/or metrology of thin films on the back surface of the wafer. In an example, the thickness and/or optical properties of a thin film on a back surface of a wafer can be determined using a ratio of a greyscale image of a bright field light emerging from the back surface of the wafer under test to that of a reference wafer.

16 Claims, 9 Drawing Sheets

(58) Field of Classification Search
CPC ............. G01N 21/8851; G01N 21/956; G01N 21/95607; G01N 2223/6116; G01N 2021/8887; G01N 2021/95615; G01N 2201/06113; G01N 2223/61; G01B 11/06; G01B 15/02; H04N 5/2254
USPC ...... 356/237.5, 498; 348/125, 126, 129, 130
See application file for complete search history.

(56) References Cited

U.S. PATENT DOCUMENTS

| | | | |
|---|---|---|---|
| 8,422,010 B2 | 4/2013 | Kirk et al. | |
| 8,611,639 B2 | 12/2013 | Kulkarni et al. | |
| 2004/0263868 A1 | 12/2004 | Isei et al. | |
| 2007/0229852 A1* | 10/2007 | Wack | G01B 11/24 356/625 |
| 2008/0316506 A1* | 12/2008 | Tsuru | G01B 11/0641 356/632 |
| 2009/0037134 A1* | 2/2009 | Kulkarni | G01N 21/9501 702/127 |
| 2012/0288616 A1 | 11/2012 | Zierhut et al. | |
| 2015/0253256 A1* | 9/2015 | Zhou | G01N 21/9501 356/237.5 |
| 2016/0202177 A1 | 7/2016 | Li et al. | |
| 2016/0275671 A1 | 9/2016 | Li et al. | |

FOREIGN PATENT DOCUMENTS

| | | | | |
|---|---|---|---|---|
| JP | 2015141176 | | 8/2015 | |
| JP | 2015141176 A | * | 8/2015 | ......... G01B 11/0625 |

OTHER PUBLICATIONS

ISA/KR, International Search Report for PCT/US2017/024332, dated Jul. 5, 2017.

* cited by examiner

ALL SURFACE FILM METROLOGY SYSTEM

CROSS-REFERENCE TO RELATED APPLICATIONS

This application claims priority to the provisional patent application filed Mar. 28, 2016 and assigned U.S. App. No. 62/314,276, the disclosure of which is hereby incorporated by reference.

FIELD OF THE DISCLOSURE

This disclosure relates to wafer inspection and metrology.

BACKGROUND OF THE DISCLOSURE

Wafer inspection and metrology systems help a semiconductor manufacturer increase and maintain integrated circuit (IC) chip yields by detecting defects that occur during the manufacturing process. One purpose of inspection and metrology systems is to monitor whether a manufacturing process meets specifications. Inspection and metrology system can indicate the problem and/or the source of the problem if the manufacturing process is outside the scope of established norms, which the semiconductor manufacturer can then address.

Evolution of the semiconductor manufacturing industry is placing ever greater demands on yield management and, in particular, on metrology and inspection systems. Critical dimensions are shrinking while wafer size is increasing. Economics is driving the industry to decrease the time for achieving high-yield, high-value production. Thus, minimizing the total time from detecting a yield problem to fixing it determines the return-on-investment for the semiconductor manufacturer.

Semiconductor wafers can include thin films, such as oxides or nitrides, which may be less than 1 nm to several μm in thickness. On a wafer, the thin film may be present on the front surface (which typically includes additional layers or semiconductor devices), back surface opposite of the front surface, or an edge between the front and back surfaces. Chemical vapor deposition (CVD), physical vapor deposition (PVD), atomic layer deposition (ALD), and epitaxy are four techniques that can be used to form such a thin film, but others are possible.

The thickness of these thin films can affect device performance or yield. Semiconductor manufacturers typically want to inspect or measure the thin film and, in particular, determine thickness and properties of the thin film. However, determining thickness and, for example, optical properties can be challenging. This is especially true for thin films present on the edge or back surface of a semiconductor wafer. Currently, there is no method to do metrology on the back surface of a wafer, especially when the front surface is patterned and cannot be placed on a wafer chuck. There also is no method to provide "all wafer surface metrology," or metrology on all surfaces of the wafer. In particular, no technique can provide back surface film metrology in manufacturing environment. Therefore, what is needed is improved metrology hardware techniques.

BRIEF SUMMARY OF THE DISCLOSURE

In a first embodiment, a system is provided. The system comprises a stage configured to hold a wafer; at least one light source configured to direct at least one beam at a front surface, a back surface opposite the front surface, and an edge between the front surface and the back surface of the wafer on the stage; at least three detectors configured to receive the beam reflected off the front surface, the back surface, and the edge; and a controller in electronic communication with the sensors. The controller is configured to perform metrology on the front surface, the back surface, and the edge. The system can include three of the light sources. The light source can include at least one colored light emitting diode. The controller can be configured to perform metrology based on inspection results determined using the detectors.

The controller can comprise a processor and the processor can be programmed to determine a thickness of the film on the back surface of the wafer by measuring a ratio of a greyscale image of the bright field light emerging from the back surface of the wafer and a reference wafer using a hardware model, a first film stack model, and a second film stack model. The hardware model includes hardware parameters of a system. The first film stack model corresponds to the reference wafer. The second film stack model corresponds to the wafer.

In a second embodiment, a method is provided. The method comprises calibrating a metrology system for metrology of a front surface, a back surface opposite the front surface, and an edge between the front surface and the back surface of a wafer. Metrology is performed on the front surface, the back surface opposite the front surface, and the edge between the front surface and the back surface of the wafer using the metrology system. The wafer can be illuminated with three light sources such that one of the light sources is used for the front surface, one of the light sources is used for the back surface, and one of the light sources is used for the edge. Light can be received from the front surface, the back surface, and the edge using three detectors. The metrology can be performed using inspection results of the front surface, the back surface, and the edge.

In a third embodiment, a method is provided. The method comprises providing a hardware model that includes hardware parameters of a system; providing at least a first film stack model and a second film stack model; illuminating the wafer with the film on the back surface; detecting, using a sensor, a greyscale image of a bright field light emerging from the back surface of the wafer with the film; communicating the greyscale image to a processor; and determining, using the processor, a thickness of the film on the back surface of the wafer by matching a measured ratio of the greyscale image of the bright field light emerging from the back surface of the wafer using the hardware model to a simulated ratio of the greyscale image using the first film stack model and the second film stack model. The first film stack model corresponds to a reference wafer and the second film stack model corresponds to a wafer with a film on a back surface. The hardware parameters can include at least one of incident angle, wavelengths of light, and parameters of a polarization conditioning element.

The system can be calibrated using a bare wafer or using a wafer having a film with a known thickness.

The bright field light can include light from a red light emitting diode, a green light emitting diode, and a blue light emitting diode. The bright field light can include light from one or more diode lasers.

Using the processor, optical properties of the film can be determined.

A film material and optical properties of the film may be known prior to the determining.

DESCRIPTION OF THE DRAWINGS

For a fuller understanding of the nature and objects of the disclosure, reference should be made to the following detailed description taken in conjunction with the accompanying drawings, in which.

DETAILED DESCRIPTION OF THE DISCLOSURE

Although claimed subject matter will be described in terms of certain embodiments, other embodiments, including embodiments that do not provide all of the benefits and features set forth herein, are also within the scope of this disclosure. Various structural, logical, process step, and electronic changes may be made without departing from the scope of the disclosure. Accordingly, the scope of the disclosure is defined only by reference to the appended claims.

Metrology hardware as disclosed herein can be used to measure thicknesses of thin films on all surfaces of wafer, including the top surface, bevel, edge apex, and backside of a wafer. While the edge apex and back surface of the wafer are typically unpatterned, the film thickness on the top and upper bevel surfaces can be patterned or unpatterned.

Metrology with high sampling density at all surfaces is gaining importance in semiconductor industry. The silicon-on-insulator (SOI) thicknesses of a film stack on the top surface of a blank wafer are a critical dimension. A 5 Angstrom thickness variation may cause up to 15% of device time variation, so the thicknesses may need to be measured at all spatial frequencies. The remaining thickness at the top surface while performing chemical-mechanical polishing (CMP) is a critical parameter for device performance and product yield. Edge thickness is also gaining importance for understanding and improving edge yield, especially in lithography steps. Furthermore, films accumulated on the back surface of a wafer can affect the wafer yield because those films may affect the etch rate in plasma chambers or misbehave when placed on an electrostatic chuck, such as an ESD chuck. In another instance, a film on a back surface of a wafer can cause contamination due to generation of particles during wafer handling.

Figure 1:
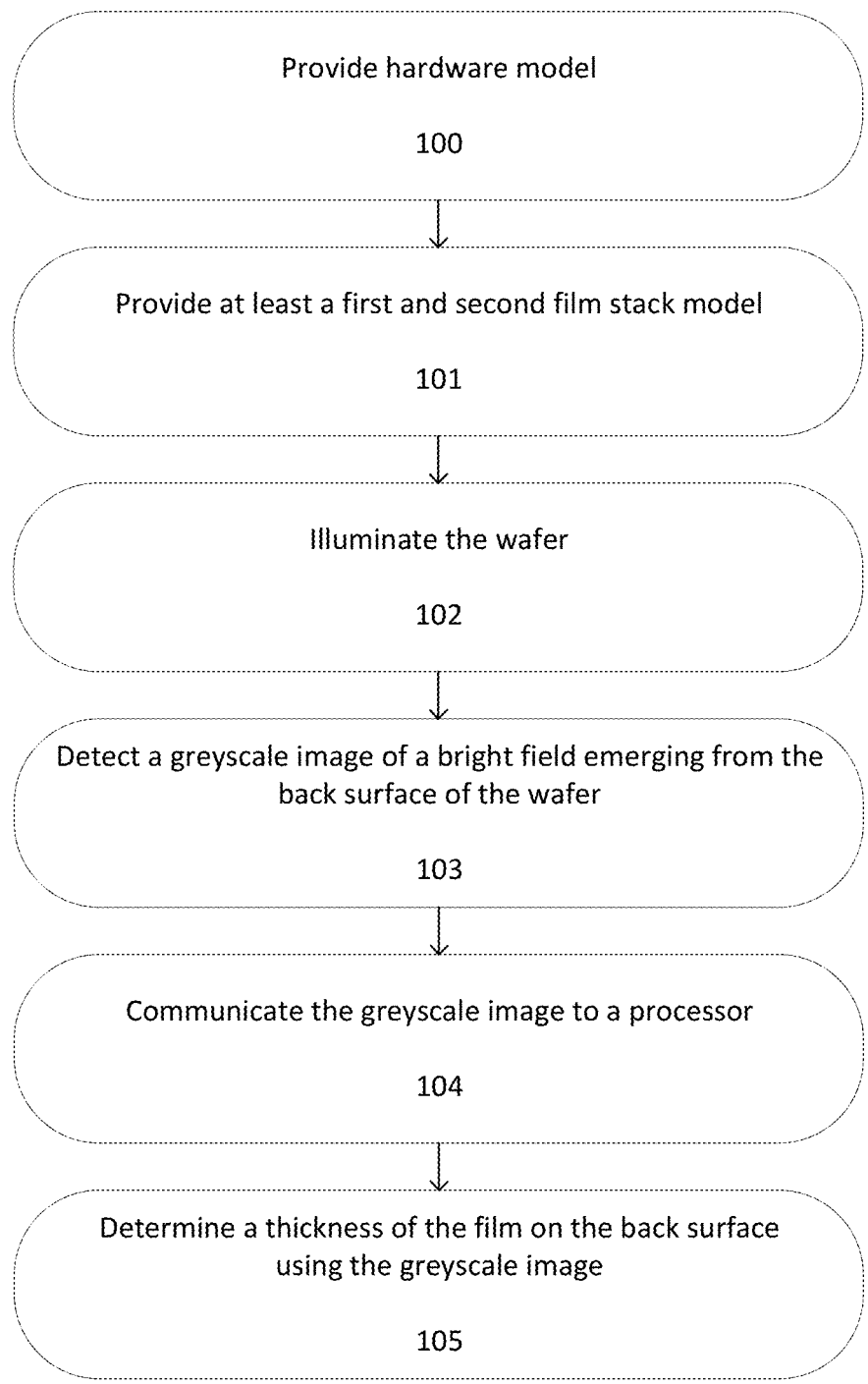
FIG. 1 is a flowchart illustrating an embodiment of a method in accordance with the present disclosure.

In a first embodiment, thin film thicknesses on the back surface of a wafer are measured. FIG. 1 is a flowchart illustrating an embodiment of this method. A hardware model that includes hardware parameters of a system is provided 100. The hardware model can include parameters that describe the characteristics of the hardware, such as angle of incidence (AOI), wavelengths of the light source illuminated on the sample, parameters of polarization conditioning elements, etc. To build the hardware model, the following steps may occur. First, a mathematical model may be built to describe the system where system parameters (e.g., AOI) are introduced. Second, those parameters can be determined by a calibration procedure. This calibration procedure may include running known samples through the system to find the value of system parameters (e.g., AOI). Third, measurements are made. Grey level data is taken on samples under test and a system model (that can include stored parameters) is applied to find the sample parameters (e.g., film thicknesses). The system parameters can be saved in the system computer after calibration, and can be read into the system model when needed to calculate sample parameters. This hardware model may be provided during a calibration process, such as the calibration 200 in FIG. 6.

Figure 8:
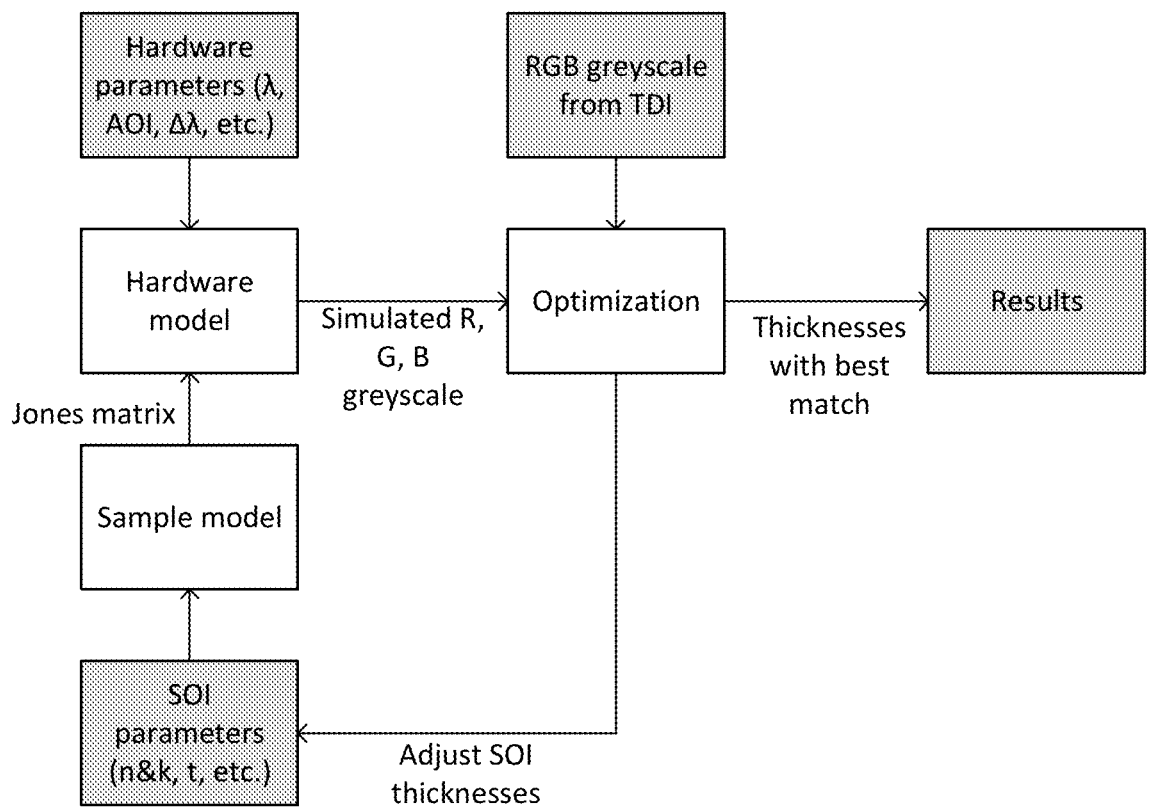
FIG. 8 is a flowchart illustrating an embodiment of a film stack model in accordance with the present disclosure, wherein data is shown in grey boxes and algorithm features are shown in white boxes.

Turning back to FIG. 1, at least a first and second film stack model are provided 101. The first film stack model corresponds to a reference wafer and the second film stack model corresponds to a wafer with a film on a back surface to be determined or analyzed. For example, one film stack model corresponds to a known reference wafer, such as a bare silicon wafer or wafer having a thin film of a known thickness. The second film stack model corresponds to the wafer being tested. The film stack models include parameters that are used to calculate thicknesses of the films and optical property of films and substrate. The formulae that convert model parameters and physical sample quantities such as thickness or optical property are user-editable mathematical expressions that can be a linear function or a complicated nonlinear relationship. FIG. 8 shows an example of process flow for the film stack models. While FIG. 8 relates to an SOI wafer, this technique can be used with other films or types of wafers.

Turning back to FIG. 1, the wafer is illuminated 102. Using a sensor, a greyscale image of a bright field light emerging from the back surface of the wafer is detected 103. Any surface of a wafer can be measured. The surface to be measured is illuminated and reflected data is recorded as grey level data. The wafer can be chucked depending on measurement on top, edge, or back surfaces of the wafer. The hardware configuration may include features of U.S. Pat. No. 7,782,452, which is incorporated by reference in its entirety. The greyscale image can be communicated to a processor 104.

Using the processor, a thickness of the film on the back surface of the wafer is determined 105 by measuring a ratio of the greyscale of the bright field light emerging from the back surface of the wafer under test with the second film stack to the greyscale of a known wafer with the first film stack and using the hardware model, the first film stack model, and the second film stack model. The ratio may be a digitized greyscale value.

Figure 2:
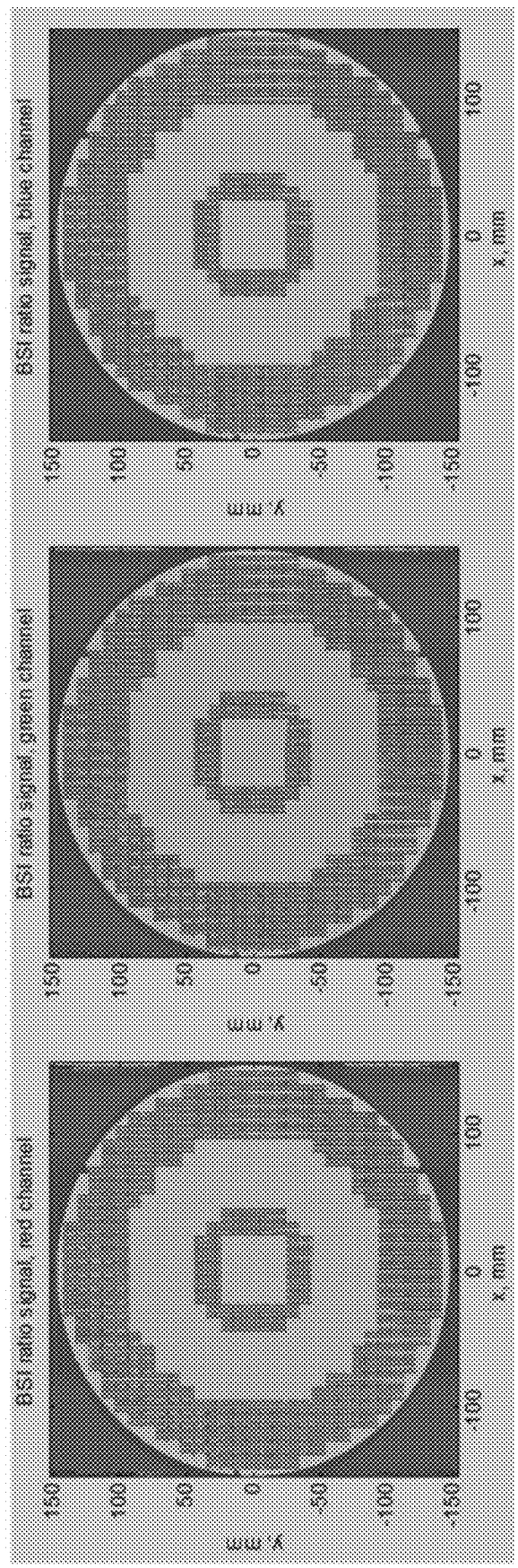
FIG. 2 is a series of example images of a greyscale ratio on a back surface of an etched film wafer, which includes data from red, green, and blue channels, at wafer view.
Figure 3:
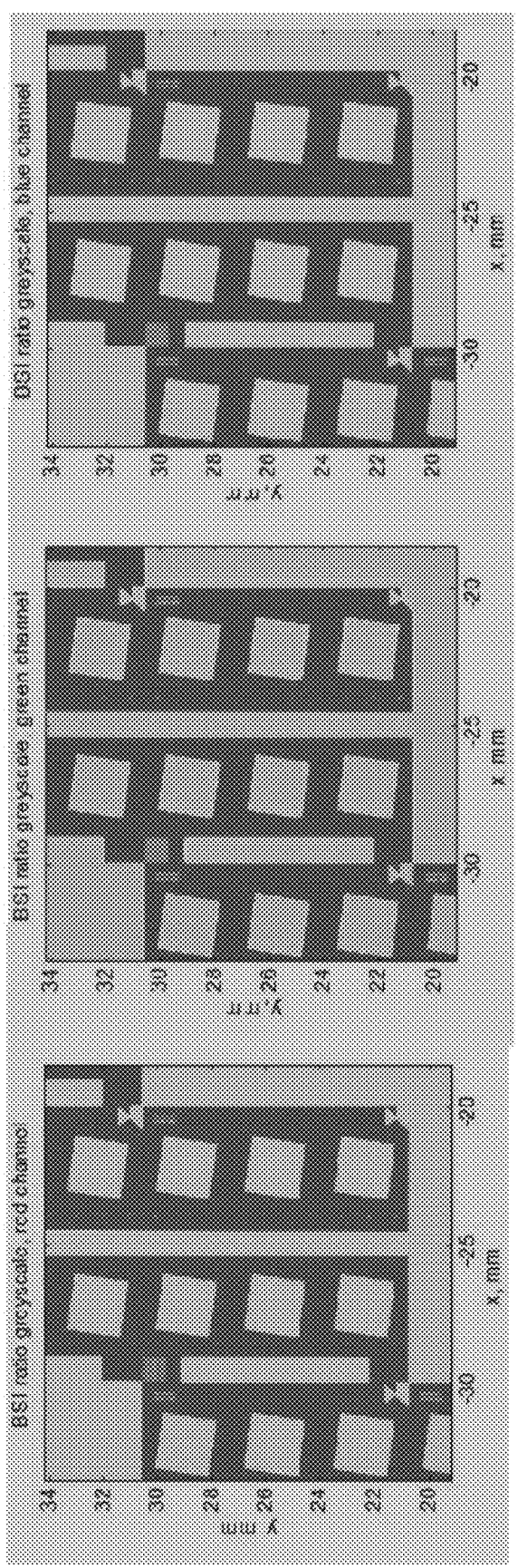
FIG. 3 is a series of example images of greyscale ratio on a back surface of an etched film wafer, with data from red, green, and blue channels, at die view.
Figure 4:
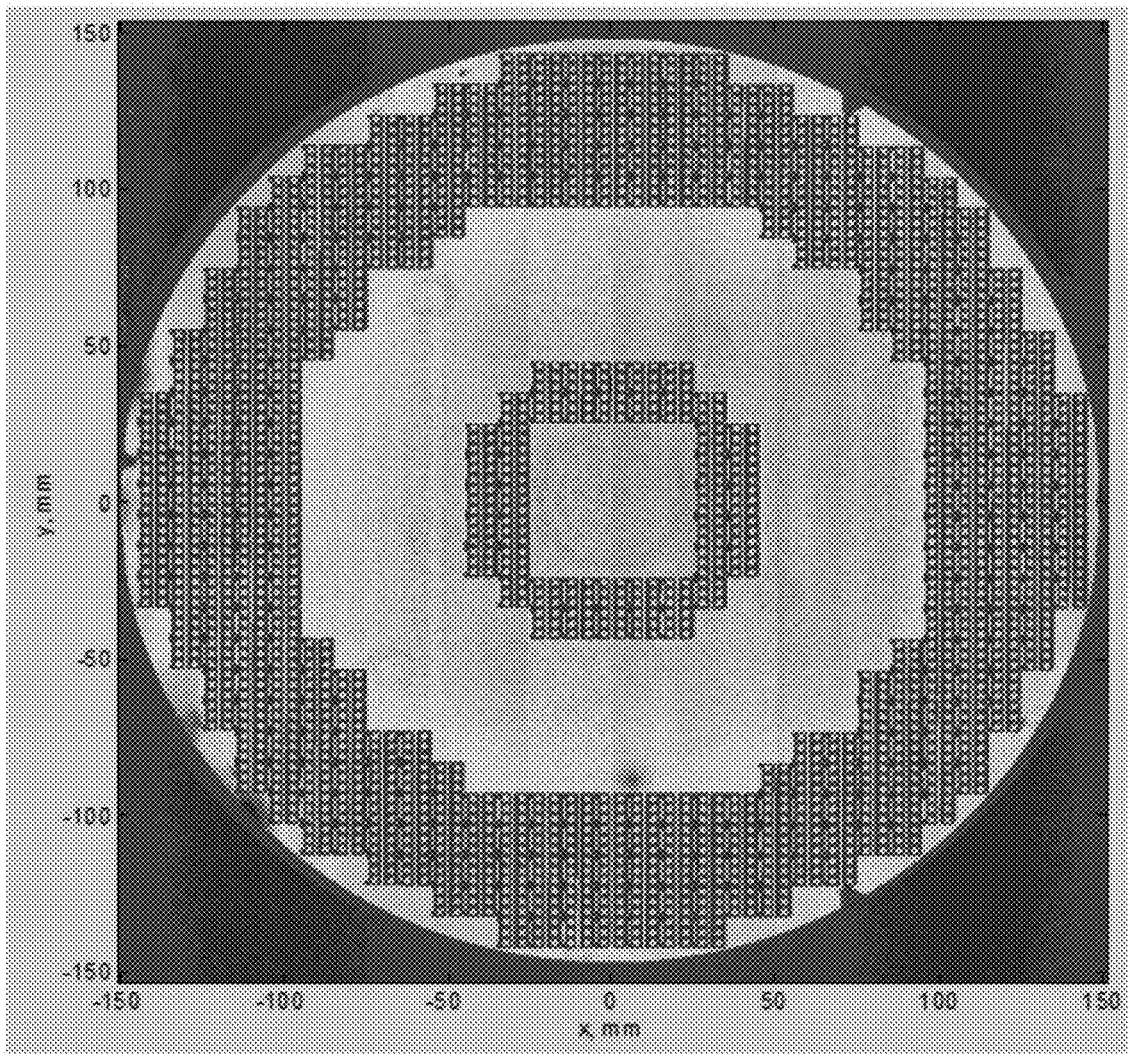
FIG. 4 is an example image of film thickness on the back surface of an etched film wafer, calculated using an embodiment in accordance with the present disclosure from a greyscale ratio of red, green, and blue channels, at wafer view.
Figure 5:
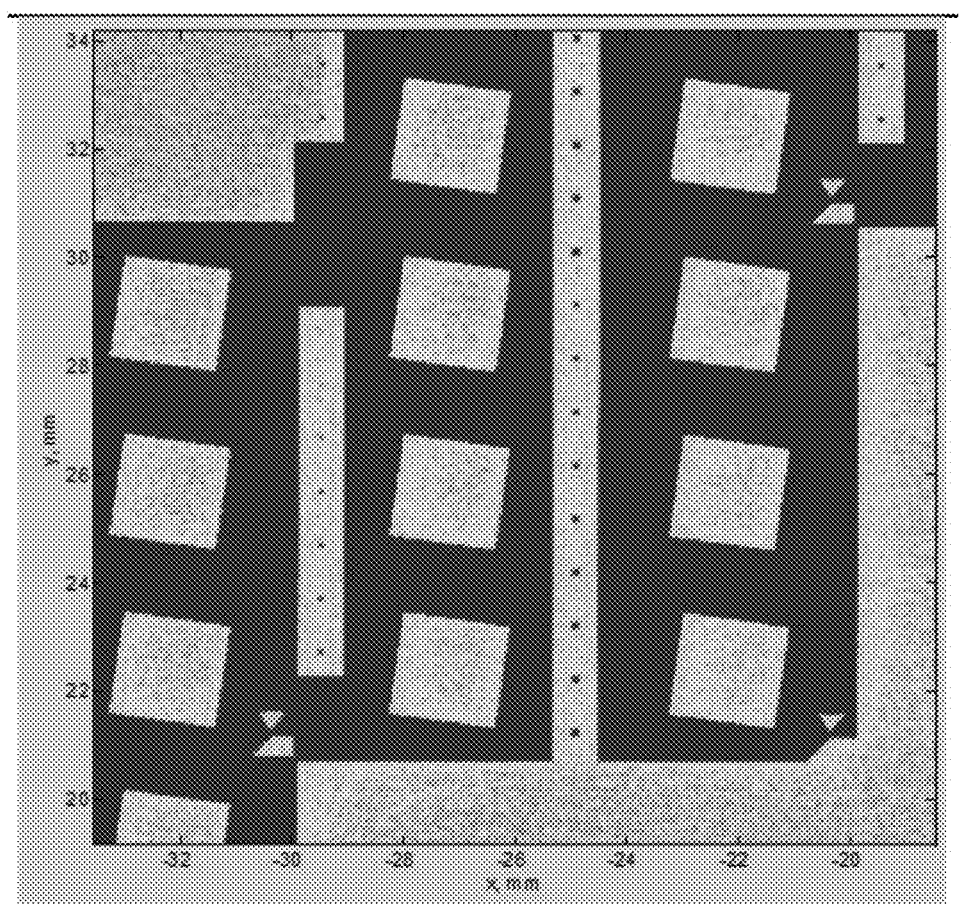
FIG. 5 is an example image of film thickness on the back surface of an etched film wafer, calculated using an embodiment in accordance with the present disclosure from a greyscale ratio of red, green, and blue channels, at die view.

Example greyscale ratios can be seen in FIGS. 2 and 3. Example calculated film thicknesses can be seen in FIGS. 4 and 5. FIG. 3 includes a small section area of FIG. 2, and FIG. 5 is a section of FIG. 4. The ratio is the greyscale value on a pixel-by-pixel base of the unknown sample to a known sample for three different illumination colors. The thickness in FIGS. 4 and 5 is an exemplary oxide layer on top of silicon, and FIGS. 4 and 5 shows the calculated exemplary oxide film thickness.

An algorithm can be used to analyze the ratio signal to extract the thin film parameters, such as thicknesses and/or optical property of the films. For example, the algorithm may constantly adjust the thickness of an unknown sample to find the best match simulated ratio signal against a measured ratio. In this example, the optical properties or material of the thin film may be known.

The relative greyscale of bright field light emerging from the backside of a wafer is measured to determine thin film thickness. For example, this can be the ratio of greyscales from back surfaces of one or more wafers under test relative to a known wafer, such as a backside polished bare silicon wafer. The measurement of the two signals can be conducted with the same hardware, such as a BSI module manufactured by KLA-Tencor Corporation of Milpitas, Calif. The ratio can be measured with any combination of wavelengths set by a recipe, such as red, green, and blue LED illuminators.

A calibration procedure can be used to determine the parameters of the hardware model. The calibration procedure includes both on-tool and off-line steps. The off-line procedure can be performed at a component level, such as measuring the LED wavelengths with a tooling spectrometer. The on-tool procedure is performed after the module is assembled. A typical procedure can be measurement on one or more known (measured by reference tool or certified by vendor) samples. Part of the algorithm can be used to convert the results of these calibration procedures into parameters of the hardware model. The hardware parameters are typically independent on the sample under test. Thus, no new calibration procedures may be needed when applying the system to a new type of applications (e.g., with a different film stack).

A data extraction algorithm can be used to analyze the measured greyscale ratio of the wafer under test, and to output the desired film parameters (related to thicknesses and/or optical property) by using the hardware model and calibration parameters mentioned herein. In an example, optical properties can be determined if the film thickness is known. In another example, film thickness can be determined if the optical properties are known. It may be difficult to determine more than three unknown parameters (e.g., thickness or optical property) in one measurement. The optical property may be the refractive index, absorption coefficient, or another property.

Figure 6:
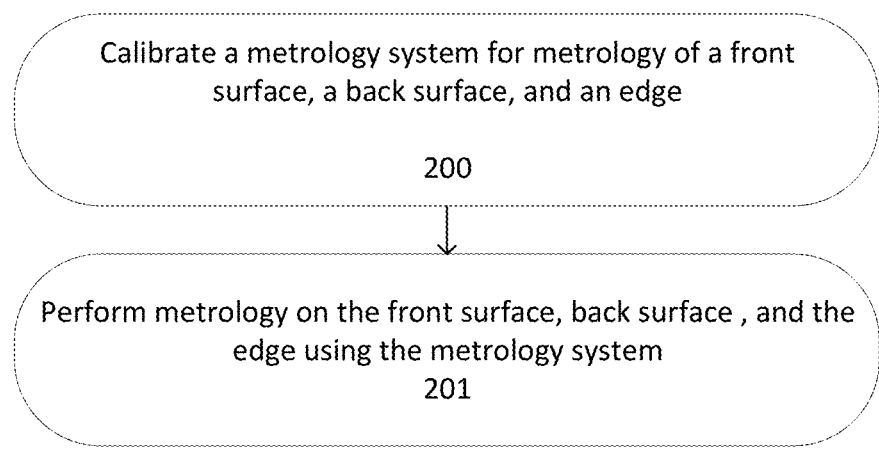
FIG. 6 is a flowchart illustrating a second embodiment of a method in accordance with the present disclosure.

FIG. 6 is a flowchart illustrating a second embodiment of this method. In this embodiment, configurable hardware provides metrology capability on any combination of top, edge, and back surfaces of a wafer. The platform can be configured to provide all surface inspection and all surface metrology with optional configuration to cover any combination of desired surfaces on top, edge, and back surfaces of a wafer. In particular, back surface metrology and inspection can be performed.

The inspection system is modified to enable all surface simultaneous inspection and metrology and/or simultaneous back surface metrology and inspection. For example, one or more colored LEDs can be added to the system to cover more application space. Design speciation of one or more modules can be configured to improve metrology performance, such as light source and/or detector stability enhancement and noise level reduction.

In the embodiment of FIG. 6, the inspection system is calibrated 200 for metrology of the front, back, and edge surfaces. Metrology is then performed 201 on the front, back, and edge surfaces using a system to simultaneously perform inspection and metrology. The system can have independent models including one for inspection of the front surface, one for inspection of the edge surface, and another for inspection of the back surface. The data from inspection can be reused for metrology purpose. Since the three modules are independent, the system can be configured to include any combinations of the three modules to cover any combination of front, edge, and back surface applications.

The system with all surface simultaneous metrology and inspection can generally be operated similar to the current inspection and review systems, though additional surfaces may need to be inspected. For example, metrology or inspection can be performed using techniques or components taught in U.S. Pat. Nos. 8,422,010 or 8,611,639, the disclosures of which are hereby incorporated by reference in their entireties. In an instance, metrology is based on inspection results. Additional calibration procedures, such as those seen in FIG. 1, also may be performed.

Manipulated image data may vary. For inspection purpose, data may be processed swath-by-swath when only one color is used. In a metrospection mode, multi-color images may be needed to calculate the final film parameters. Data buffer may be needed to hold the middle images before finishing data taking with all colors.

A system can include the algorithms disclosed herein as well as provide presentation of the measurement results.

Figure 7:
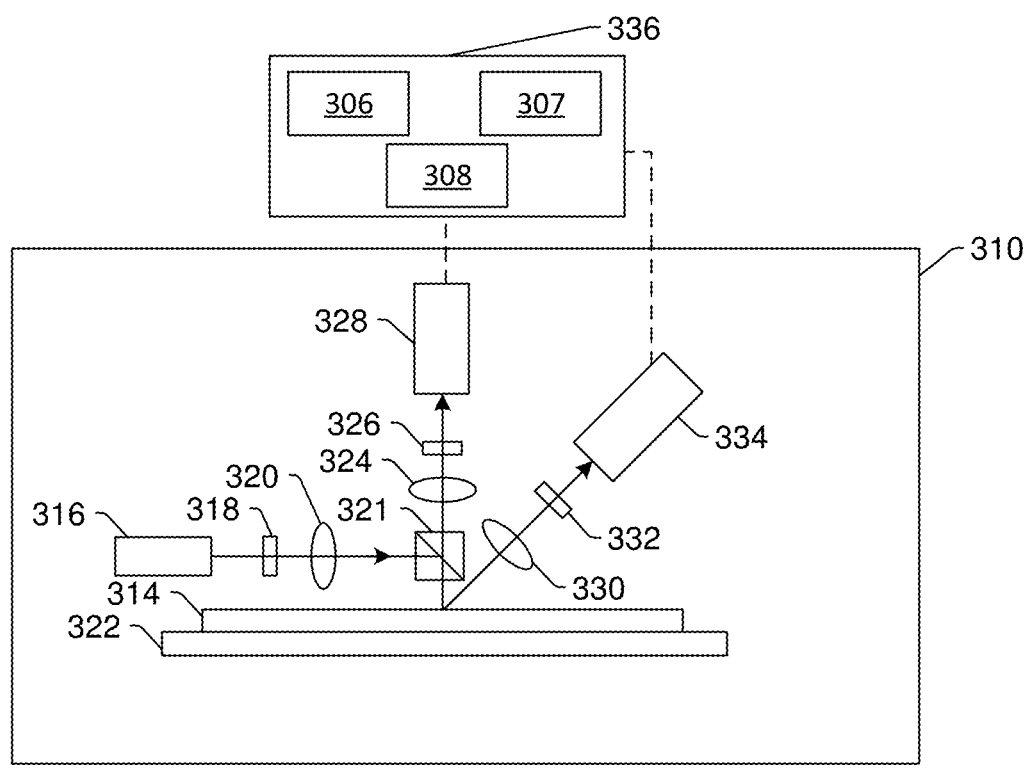
FIG. 7 is a block diagram of a system in accordance with the present disclosure.

The embodiments described herein may include or may be performed by a system. One embodiment of such a system is shown in FIG. 7. The system includes an output acquisition subsystem that includes at least an energy source and a detector. The energy source is configured to generate energy that is directed to a wafer. The detector is configured to detect energy from the wafer and to generate output responsive to the detected energy.

In an embodiment, the energy directed to the wafer includes light, and the energy detected from the wafer includes light. For example, in the embodiment of the system shown in FIG. 7, output acquisition subsystem 310 includes an illumination subsystem configured to direct light to wafer 314. The illumination subsystem includes at least one light source. For example, as shown in FIG. 7, the illumination subsystem includes light source 316. In one embodiment, the illumination subsystem is configured to direct the light to the wafer 314 at one or more angles of incidence, which may include one or more oblique angles and/or one or more normal angles. For example, as shown in FIG. 7, light from light source 316 is directed through optical element 318 and then lens 320 to beam splitter 321, which directs the light to wafer 314 at a normal angle of incidence. The angle of incidence may include any suitable angle of incidence, which may vary depending on, for instance, characteristics of the wafer.

As used herein, the term "wafer" generally refers to substrates formed of a semiconductor or non-semiconductor material. Examples of such a semiconductor or non-semiconductor material include, but are not limited to, monocrystalline silicon, gallium nitride, gallium arsenide, indium phosphide, sapphire, and glass. Such substrates may be commonly found and/or processed in semiconductor fabrication facilities.

A wafer may include one or more layers formed upon a substrate. For example, such layers may include, but are not limited to, a photoresist, a dielectric material, a conductive material, and a semiconductive material. Many different types of such layers are known in the art, and the term wafer as used herein is intended to encompass a wafer including all types of such layers.

One or more layers formed on a wafer may be patterned or unpatterned. For example, a wafer may include a plurality of dies, each having repeatable patterned features or periodic structures. Formation and processing of such layers of material may ultimately result in completed devices. Many different types of devices may be formed on a wafer, and the term wafer as used herein is intended to encompass a wafer on which any type of device known in the art is being fabricated.

Figure 9:
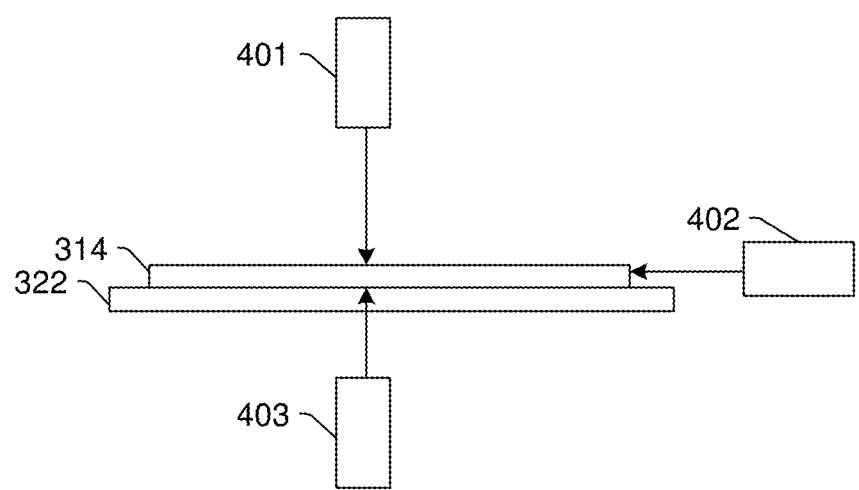
FIG. 9 is a block diagram of another system in accordance with the present disclosure.

While the system shows a light source 316 and detectors 328, 334 using light reflected off the front surface of the wafer 314, additional light sources and/or detectors can be used with light reflected off the edge and back surface. Thus, there can be three sets of detectors in the system with at least one light source. For example, there can be three sets of light sources and detectors in the system. FIG. 9 shows an exemplary system with a wafer 314 held on a stage 322 and three modules 401, 402, 403. Each module 401, 402, 403 can include a light source and a detector, such as those described with respect to FIG. 7. The module 401 illuminates a front surface of the wafer 314 and detects light from the front surface of the wafer 314. The module 402 illuminates an edge of the wafer 314 and detects light from the edge of the wafer 314. The module 403 illuminates a back surface of the wafer 314 and detects light from the back surface of the wafer 314. Each of the modules 401, 402, 403 can communicate with a controller.

Turning back to FIG. 7, the illumination subsystem may be configured to direct the light to the wafer at different angles of incidence at different times. For example, the output acquisition subsystem may be configured to alter one or more characteristic of one or more elements of the illumination subsystem such that the light can be directed to the wafer at an angle of incidence that is different than that shown in FIG. 7. In one such example, the output acquisition subsystem may be configured to move light source 316, optical element 318, and lens 320 such that the light is directed to the wafer 314 at a different angle of incidence.

In some instances, the output acquisition subsystem may be configured to direct light to the wafer at more than one angle of incidence at the same time. For example, the illumination subsystem may include more than one illumination channel. One of the illumination channels may include light source 316, optical element 318, and lens 320 as shown in FIG. 7 and another of the illumination channels (not shown) may include similar elements, which may be configured differently or the same, or may include at least a light source and possibly one or more other components such as those described further herein. If such light is directed to the wafer at the same time as the other light, one or more characteristics (e.g., wavelength, polarization, etc.) of the light directed to the wafer at different angles of incidence may be different such that light resulting from illumination of the wafer at the different angles of incidence can be discriminated from each other at the detector(s).

In another instance, the illumination subsystem may include only one light source (e.g., source 316 shown in FIG. 7) and light from the light source may be separated into different optical paths (e.g., based on wavelength, polarization, etc.) by one or more optical elements (not shown) of the illumination subsystem. Light in each of the different optical paths may then be directed to the wafer. Multiple illumination channels may be configured to direct light to the wafer at the same time or at different times (e.g., when different illumination channels are used to sequentially illuminate the wafer). In another instance, the same illumination channel may be configured to direct light to the wafer with different characteristics at different times. For example, in some instances, optical element 318 may be configured as a spectral filter and the properties of the spectral filter can be changed in a variety of different ways (e.g., by swapping out the spectral filter) such that different wavelengths of light can be directed to the wafer at different times. The illumination subsystem may have any other suitable configuration known in the art for directing the light having different or the same characteristics to the wafer at different or the same angles of incidence sequentially or simultaneously.

In one embodiment, light source 316 may include a broadband plasma (BBP) light source. In this manner, the light generated by the light source and directed to the wafer may include broadband light. However, the light source may include any other suitable light source such as a laser. The laser may include any suitable laser known in the art and may be configured to generate light at any suitable wavelength or wavelengths known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands. The light source 316 may be a broad-spectrum source, such as a white light source, or a more narrow-spectrum source, such as a red light, blue light, or green light source. More than one light source may be used, such that the system may take advantage of images having different modalities.

Light from optical element 318 may be focused to beam splitter 321 by lens 320. Although lens 320 is shown in FIG. 7 as a single refractive optical element, it is to be understood that, in practice, lens 320 may include a number of refractive and/or reflective optical elements that in combination focus the light from the optical element to the wafer. The illumination subsystem shown in FIG. 7 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for output acquisition.

The output acquisition subsystem may also include a scanning subsystem configured to cause the light to be scanned over the wafer. For example, the output acquisition subsystem may include stage 322 on which wafer 314 is disposed during output acquisition. The scanning subsystem may include any suitable mechanical and/or robotic assembly (that includes stage 322) that can be configured to move the wafer 314 such that the light can be scanned over the wafer. In addition, or alternatively, the output acquisition subsystem may be configured such that one or more optical elements of the output acquisition subsystem perform some scanning of the light over the wafer 314. The light may be scanned over the wafer in any suitable fashion.

The output acquisition subsystem further includes one or more detection channels. At least one of the one or more detection channels includes a detector configured to detect light from the wafer 314 due to illumination of the wafer 314 by the output acquisition subsystem and to generate output responsive to the detected light. For example, the output acquisition subsystem shown in FIG. 7 includes two detection channels, one formed by collector 324, element 326, and detector 328 and another formed by collector 330, element 332, and detector 334. As shown in FIG. 7, the two detection channels are configured to collect and detect light at different angles of collection. In some instances, one detection channel is configured to detect specularly reflected light, and the other detection channel is configured to detect light that is not specularly reflected (e.g., scattered, diffracted, etc.) from the wafer. However, two or more of the detection channels may be configured to detect the same type of light from the wafer (e.g., specularly reflected light). Although FIG. 7 shows an embodiment of the output acquisition subsystem that includes two detection channels, the output acquisition subsystem may include a different number of detection channels (e.g., only one detection channel or two or more detection channels). Although each of the collectors are shown in FIG. 7 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), CMOS devices, charge coupled devices (CCDs), and time delay integration (TDI) cameras. The detectors may also include any other suitable detectors known in the art. The detectors may also include non-imaging detectors or imaging detectors. In an instance, the detectors may be configured as imaging detectors that are configured to generate imaging signals or image data. Therefore, the system may be configured to generate the images described herein in a number of ways.

It is noted that FIG. 7 is provided herein to generally illustrate a configuration of an output acquisition subsystem that may be included in the system embodiments described herein. The output acquisition subsystem configuration described herein may be altered to optimize the performance of the system as is normally performed when designing a commercial system. In addition, the systems described herein may be implemented using an existing output acquisition system (e.g., by adding functionality described herein to an existing output acquisition system) such as tools that are commercially available from KLA-Tencor Corporation of Milpitas, Calif. For some such systems, the methods described herein may be provided as optional functionality of the output acquisition system (e.g., in addition to other functionality of the output acquisition system). Alternatively, the system described herein may be designed provide a completely new system.

Controller 336 of the system may be coupled to the detectors of the output acquisition subsystem in any suitable manner (e.g., via one or more transmission media, which may include "wired" and/or "wireless" transmission media) such that the controller 336 can receive the output generated by the detectors during scanning of the wafer 314. Controller 336 may be configured to perform a number of functions using the output of the detectors as described herein and any other functions described further herein. This controller may be further configured as described herein.

If the system includes an additional computer subsystem, then the different computer subsystems may be coupled to each other such that images, data, information, instructions, etc. can be sent between the computer subsystems as described further herein. For example, controller 336 may be coupled to another computer subsystem(s) (not illustrated) by any suitable transmission media, which may include any suitable wired and/or wireless transmission media known in the art. Two or more of such computer subsystems may also be effectively coupled by a shared computer-readable storage medium (not shown).

The controller 336 can include a processor 306, a storage device 307 in electronic communication with the processor 306, and a communication port 308 in electronic communication with the processor 306. It is to be appreciated that the controller 336 may be implemented in practice by any combination of hardware, software, and firmware. For example, the communication port 308 may be a network port, such as an Ethernet port or a wireless Ethernet port. In an instance, the communication port 308 may be, for example, a serial interface to the output acquisition subsystem 310. Also, its functions as described herein may be performed by one unit, or divided up among different components, each of which may be implemented in turn by any combination of hardware, software and firmware. Program code or instructions for the controller 336 to implement the various methods and functions described herein may be stored in controller readable storage media, such as a memory, within the controller 336, external to the controller 336, or combinations thereof.

The controller 336 may perform metrology or determine thin film thickness and/or optical properties. For example, the controller 336 may perform the steps of FIG. 1, FIG. 6, or FIG. 8. The controller 336 also may perform other steps or techniques disclosed herein.

The controller 336 may be coupled to the detectors in any suitable manner (e.g., via one or more transmission media, which may include "wired" and/or "wireless" transmission media) such that the controller 336 can receive the output generated by the output acquisition subsystem 310. The controller 336 may be configured to perform a number of functions using the output of the detectors. Inspection or metrology of the wafer 303 may be performed by the controller 336 by applying some process control or compliance algorithm and/or method to the output generated by the detectors. For example, film thickness or optical properties can be determined.

The controller 336, other system(s), or other subsystem(s) described herein may take various forms, including a personal computer system, image computer, mainframe computer system, workstation, network appliance, internet appliance, or other device. In general, the term "controller" may be broadly defined to encompass any device having one or more processors, which executes instructions from a memory medium. The subsystem(s) or system(s) may also include any suitable processor known in the art such as a parallel processor. In addition, the subsystem(s) or system(s) may include a platform with high speed processing and software, either as a standalone or a networked tool.

If the system includes more than one subsystem, then the different subsystems may be coupled to each other such that images, data, information, instructions, etc. can be sent between the subsystems. For example, one subsystem may be coupled to additional subsystem(s) by any suitable transmission media, which may include any suitable wired and/or wireless transmission media known in the art. Two or more of such subsystems may also be effectively coupled by a shared computer-readable storage medium (not shown).

An additional embodiment relates to a non-transitory computer-readable medium storing program instructions executable on a controller for performing a computer-implemented method for identifying abnormalities on a wafer or detecting compliance/non-compliance, as disclosed herein. In particular, as shown in FIG. 7, storage device 307 or other storage medium may contain non-transitory computer-readable medium that includes program instructions executable on the controller 336. The computer-implemented method may include any step(s) of any method(s) described herein.

Program instructions implementing methods such as those described herein may be stored on computer-readable medium, such as in the storage device 307 or other storage medium. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Controller 336 may be configured according to any of the embodiments described herein. In an instance, the processor 306 is programmed to perform any of the methods described herein.

Although the present disclosure has been described with respect to one or more particular embodiments, it will be understood that other embodiments of the present disclosure may be made without departing from the scope of the present disclosure. Hence, the present disclosure is deemed limited only by the appended claims and the reasonable interpretation thereof.

What is claimed is:

1. A system comprising:
a stage configured to hold a wafer;
at least one light source configured to direct at least one beam at a front surface, a back surface opposite the front surface, and an edge between the front surface and the back surface of the wafer on the stage;
at least three detectors configured to receive the at least one beam reflected off the front surface, the back surface, and the edge and generate image data; and
a controller in electronic communication with the three detectors, wherein the controller is configured to perform metrology on the front surface, the back surface, and the edge using the image data, wherein the controller comprises a processor and the processor is programmed to determine a thickness of a film on the back surface of the wafer by measuring a ratio of a greyscale image of bright field light emerging from the back surface of the wafer and a reference wafer using a hardware model, a first film stack model, and a second film stack model, wherein the hardware model is mathematically expressed and includes hardware parameters of the system including at least one of incident angle, wavelengths of light, and parameters of a polarization conditioning element and is built from grey level data taken on samples under test, wherein the first film stack model is mathematically expressed and corresponds to the reference wafer, wherein the second film stack model is mathematically expressed and corresponds to the wafer, and wherein each of the first film stack model and the second film stack model includes a parameter used to calculate the thickness of the film and optical property of the film and the wafer.

2. The system of claim 1, wherein the system includes three of the light sources.

3. The system of claim 1, wherein the light source includes at least one colored light emitting diode.

4. The system of claim 1, wherein the controller is configured to perform metrology based on inspection results determined using the three detectors.

5. A method comprising:
providing a hardware model that is mathematically expressed and includes hardware parameters of a system, wherein the hardware parameters include at least one of incident angle, wavelengths of light, and parameters of a polarization conditioning element, and wherein the hardware model is built from grey level data taken on samples under test;
providing at least a first film stack model and a second film stack model, wherein the first film stack model is mathematically expressed and corresponds to a reference wafer and the second film stack model is mathematically expressed and corresponds to a wafer with a film on a back surface, wherein each of the first film stack model and the second film stack model include a parameter used to calculate a thickness of the film and optical property of the film and the wafer;
illuminating the wafer with the film on the back surface;
detecting, using a sensor, a greyscale image of a bright field light emerging from the back surface of the wafer with the film;
communicating the greyscale image to a processor; and
determining, using the processor, a thickness of the film on the back surface of the wafer by matching a measured ratio of the greyscale image of the bright field light emerging from the back surface of the wafer using the hardware model to a simulated ratio of the greyscale image using the first film stack model and the second film stack model.

6. The method of claim 5, further comprising calibrating the system using a bare wafer.

7. The method of claim 5, further comprising calibrating the system using a wafer having a film with a known thickness.

8. The method of claim 5, wherein the bright field light includes light from a red light emitting diode, a green light emitting diode, and a blue light emitting diode.

9. The method of claim 5, wherein the bright field light includes light from one or more diode lasers.

10. The method of claim 5, further comprising determining, using the processor, optical properties of the film.

11. The method of claim 5, wherein a film material and optical properties of the film are known prior to the determining.

12. The system of claim 1, wherein each of the three detectors is one of a photo-multiplier tube, a CMOS device, a charge coupled device, or a time delay integration camera.

13. The system of claim 1, wherein the controller is further configured to perform an inspection of the wafer using the image data, and wherein the inspection is performed simultaneously with the metrology.

14. The method of claim 5, further comprising inspecting the wafer, using the processor, simultaneously with the determining of the thickness.

15. The method of claim 5, further comprising performing metrology on the back surface, a top surface, and an edge between the front surface and the back surface of the wafer.

16. The method of claim 5, wherein the illuminating includes directing a beam at each of the back surface, a front surface opposite the back surface, and an edge between the front surface and the back surface of the wafer.

* * * * *